United States Patent
Harris et al.

(10) Patent No.: US 9,206,061 B1
(45) Date of Patent: Dec. 8, 2015

(54) ALTERNATING OSMOTIC PRESSURE FROM A METAL SALT OSMOLYTE TO ENHANCE FORWARD OSMOSIS PROCESSES

(71) Applicants: James Jeffrey Harris, Cameron Park, CA (US); Upen Jayant Bharwada, Scottsdale, AZ (US)

(72) Inventors: James Jeffrey Harris, Cameron Park, CA (US); Upen Jayant Bharwada, Scottsdale, AZ (US)

( * ) Notice: Subject to any disclaimer, the term of this patent is extended or adjusted under 35 U.S.C. 154(b) by 0 days.

(21) Appl. No.: 14/820,166

(22) Filed: Aug. 6, 2015

Related U.S. Application Data

(60) Provisional application No. 62/033,946, filed on Aug. 6, 2014.

(51) Int. Cl.
- *C02F 1/00* (2006.01)
- *C02F 1/44* (2006.01)
- *B01D 37/00* (2006.01)
- *C02F 103/08* (2006.01)
- *C02F 101/10* (2006.01)

(52) U.S. Cl.
CPC ............ *C02F 1/445* (2013.01); *C02F 2101/10* (2013.01); *C02F 2103/08* (2013.01)

(58) Field of Classification Search
CPC .. C02F 1/445; C02F 2101/10; C02F 2103/08; C02F 1/00; C02F 1/001; C02F 1/02; C02F 1/20; C02F 1/44; C02F 1/441; C02F 1/52; C02F 9/00; C02F 2103/001; C02F 2103/007; C02F 2103/12; C02F 2103/32; C02F 2209/24; C02F 2301/08; B01D 29/00; B01D 29/0095; B01D 29/0002; B01D 29/0004; B01D 29/50; B01D 29/56; B01D 37/00; B01D 39/00; B01D 39/14; B01D 61/00; B01D 61/002; B01D 61/005; B01D 61/02; B01D 61/022; B01D 61/025; B01D 61/08; B01D 61/10; B01D 61/58; B01D 63/00; B01D 63/08; B01D 2311/02; B01D 2311/04; B01D 2311/06; B01D 2301/08
USPC ......................................................... 210/638
See application file for complete search history.

(56) References Cited

U.S. PATENT DOCUMENTS

| | | | |
|---|---|---|---|
| 3,721,621 A | 3/1973 | Hough | |
| 2005/0145568 A1* | 7/2005 | McGinnis | B01D 61/002 210/639 |
| 2006/0144789 A1* | 7/2006 | Cath | B01D 61/002 210/641 |
| 2009/0297431 A1* | 12/2009 | McGinnis | B01D 3/146 423/580.1 |

* cited by examiner

*Primary Examiner* — Allison Fitzsimmons
(74) *Attorney, Agent, or Firm* — DuBois, Bryant & Campbell LLP; William D. Wiese

(57) ABSTRACT

$CO_2$ absorption and desorption affords differing osmotic pressure metal salt osmolyte draw solutions from a common solution. These draw solutions serve a staged forward osmosis membrane process. First stage draw solution is the lowest osmotic pressure osmolyte. First stage concentrate is fed to the second stage and fresh water is externally extracted from the first stage diluted osmolyte. Concentrated first stage osmolyte returns from fresh water extraction, blends and is heated with solid precipitates of the lower osmotic pressure solute. $CO_2$ desorbs from the lower osmotic pressure osmolyte converting to a higher osmotic pressure osmolyte. The higher osmotic pressure osmolyte serves as second stage draw solution to further dewatering the first stage concentrate. Second stage concentrate conveys to external processing or discharge. $CO_2$ absorption converts the dilute high osmotic pressure osmolyte from the second stage to the lower osmotic pressure osmolyte serving as draw solution in the first stage.

11 Claims, 4 Drawing Sheets

ALTERNATING OSMOTIC PRESSURE FROM A METAL SALT OSMOLYTE TO ENHANCE FORWARD OSMOSIS PROCESSES

CROSS-REFERENCE TO RELATED APPLICATIONS

This non-provisional patent application claims priority based upon prior U.S. Provisional Patent Application Ser. No. 62/033,946 filed Aug. 6, 2014, in the name of James Jeffrey Harris and Upen Jayant Bharwada, entitled "Alternating Osmotic Pressure from a Metal Salt Osmolyte to Enhance Forward Osmosis Processes," the disclosure of which is incorporated herein in its entirety by reference as if fully set forth herein.

BACKGROUND OF THE INVENTION

The art of the present invention relates generally to providing a thermally responding osmolyte draw solution for a forward osmosis assisted freshwater generation process wherein the osmolyte draw solution is thermally shifted between existing as a lower and a higher osmotic pressure osmolyte. The effect parlays both an advantageous efficiency toward freshwater recovery as well as providing a means for freshwater recovery from otherwise intractable very high total dissolved solids (TDS) feed waters. Embodiments of the present invention apply particularly well to increasing the recovery of freshwater from reverse osmosis processes, although the present invention is amenable for use with other freshwater extraction processes.

U.S. Pat. No. 3,721,621 presents a method wherein a forward osmosis process dewaters a feed water, such as seawater, employing a pH sensitive, high TDS, high osmotic pressure draw solution. A higher volume, dilute draw solution results. The pH of this dilute draw solution is thereafter shifted facilitating precipitation of solute, resulting in a lower TDS product than the feed water serviced. This prior art suffers from the consumable expense of the pH sensitive solute as well as pH shifting chemicals. Further the final product effluent remains relatively high in TDS, reducing its applicable value.

The prior art has attempted achieving increased recovery from reverse osmosis processes by improvements of commercial membrane rejection ratios as well as employing higher pressure amenable membranes and associated strengthened support structures. The burden is structural limitations due to the high osmotic pressures associated with increased TDS and recovery ratio. The present invention, in particular, resolves the high pressure limitations and performance frailties associated with the prior art. When combined with reverse osmosis processes as well as other freshwater extraction processes, the present invention affords a novel means to increase the freshwater recovery factor and concentrate TDS with the employ of low grade thermal energy.

BRIEF SUMMARY OF THE INVENTION

A process is provided to facilitate improved freshwater recovery and increased concentrate effluent TDS from a conventional freshwater extraction process (hereinafter, for simplicity, referenced as reverse osmosis or RO regardless of the freshwater extraction technology by the employ of thermal energy. The process also provides a means to extract freshwater from very high TDS feed waters which are otherwise intractable by the prior art.

The process employs two or more forward osmosis processes wherein the employed osmotic draw solutions contain an aqueous solution of a metallic salt. This salt has a thermally dependent affinity for carbon dioxide ($CO_2$). At lower temperatures the salt absorbs $CO_2$ while at higher temperatures the salt liberates $CO_2$. The $CO_2$ entrained metal salt has a moderately high solubility, TDS and associated osmotic pressure. In contrast, the metal salt lacking $CO_2$ has a very high solubility, TDS and associated osmotic pressure.

For ease of discussion, a draw solution containing solutes of the metal salt that is primarily entrained with $CO_2$ will be referred to as Osmolyte A. A draw solution containing solutes that primarily do not contain $CO_2$ will be referred to as Osmolyte B.

As a consequence of solutes, Osmolyte A preferentially has a lower solubility, TDS, and osmotic pressure while Osmolyte B has a much higher solubility, TDS, and osmotic pressure. This variance of osmotic pressures is relevant to the present invention.

The process operates in a fashion which dramatically improves RO recovery and associated generation of high TDS concentrate.

Moderately high TDS feed water (such as seawater) is dewatered by a forward osmosis process employing Osmolyte A. The resulting diluted Osmolyte A effluent is conveyed to an external RO system for dewatering and generation of a fresh permeate as well as concentrated Osmolyte A.

The concentrated Osmolyte A is returned from the external RO, heated, and converted by $CO_2$ emission to Osmolyte B. Since Osmolyte B has a much higher solubility than Osmolyte A, additional Osmolyte A solute is blended and converted to Osmolyte B during the heating process serving to drive the generated Osmolyte B TDS and osmotic pressure very high. This high osmotic pressure Osmolyte B is employed as draw solution in a second forward osmosis process.

This second forward osmosis system employs the very high osmotic pressure Osmolyte B draw solution to dewater the concentrate effluent from the first forward osmosis process. The very high osmotic pressure of Osmolyte B efficiently dewaters this concentrate, generating a very high osmotic pressure concentrate effluent from the second forward osmosis process. The diluted from the Osmolyte B effluent from the second forward osmosis process is cooled while in absorbing contact with $CO_2$ resulting in conversion of Osmolyte B back into the much lower solubility Osmolyte A.

The conversion of the much higher solubility Osmolyte B into Osmolyte A generates a saturated Osmolyte A solution as well as a solute precipitate of Osmolyte A. The saturated Osmolyte A solution is used as the draw solution in the first forward osmosis process to initially dewater the feed water.

The solute precipitate of Osmolyte A is conveyed as the Osmolyte A solute to the previously discussed heating process, in which the Osmolyte B is generated from the external RO return concentrate. The cycle is closed with a very high TDS and osmotic pressure concentrate discharged from the second forward osmosis process affirming to a very high recovery.

BRIEF DESCRIPTION OF THE DRAWINGS

For a more complete understanding of the present invention, and the advantages thereof, reference is now made to the following descriptions taken in conjunction with the accompanying figures, wherein.

DETAILED DESCRIPTION OF THE INVENTION

Information relating to the application, usage, and benefits of the presently preferred embodiment is discussed in detail below. It should be appreciated, however, that the present invention provides many applicable inventive concepts that can be embodied in a wide variety of specific contexts. The specific embodiments discussed are merely illustrative of specific ways to make and use the present invention, and do not limit its scope.

The present invention will be described with respect to preferred embodiments in a specific context, namely as a process for improving the recovery performance of freshwater extraction processes and a means to increase the concentration (TDS) level and associated osmotic pressure of the concentrate effluent normally associated with freshwater extraction processes. The present invention may also be relevant, however, to other situations where osmotic process functions are affected.

Figure 1:
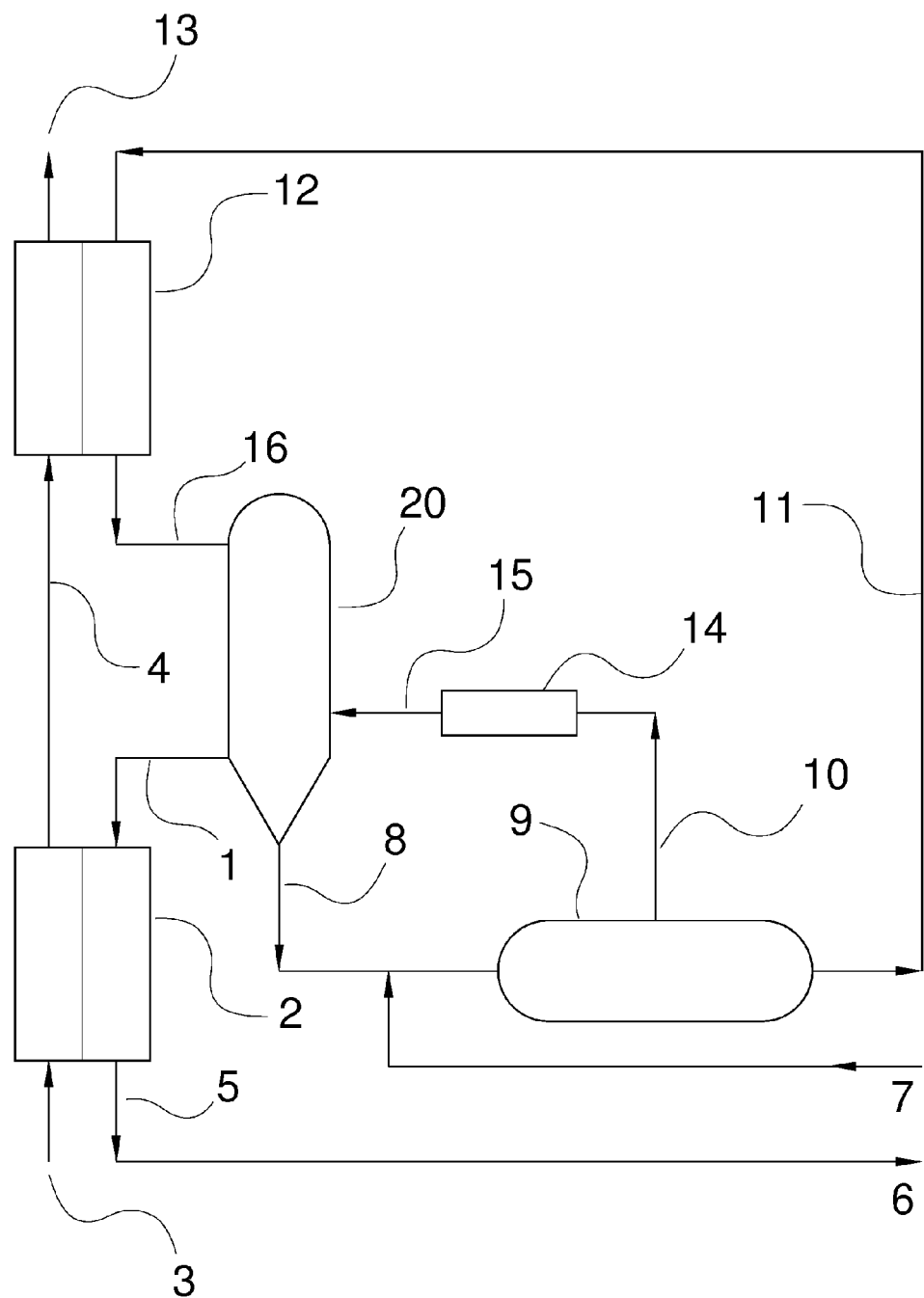
FIG. 1 depicts a process diagram of an embodiment of the present invention wherein the highest freshwater recovery is engendered. This embodiment assists cooling of Osmolyte B by pre-cooling $CO_2$ emitted during the heating process to convert Osmolyte A into Osmolyte B. This embodiment also employs mixing of returned freshwater extraction process concentrate with Osmolyte A solids precipitate before said heating process.

With reference now to FIG. 1 a feed water stream 3, from which fresher water is to be extracted, conveys into a first forward osmosis process 2. A moderately high TDS and osmotic pressure solution (Osmolyte A) 1 conveys into and services dewatering of feed water 3 in the first forward osmosis process 2.

Moderately high TDS and osmotic pressure concentrate 4 egresses the first forward osmosis process 2 and conveys as feed water into a second forward osmosis process 12. Dilute Osmolyte A effluent 5, from the first forward osmosis process 2, conveys as feed fluid 6 to an external freshwater extraction process. Concentrated Osmolyte A 7 returns from the external freshwater extraction process as a high TDS, high osmotic pressure concentrate.

The returning concentrated Osmolyte A stream 7 combines and is heated 9 with precipitated solids of Osmolyte A 8. $CO_2$ 10 is expelled and conveyed for further use 15. Combined addition of Osmolyte A solute 8, heating, and $CO_2$ emission 10, converts the concentrated Osmolyte A stream 7 into a very much higher TDS and osmotic pressure Osmolyte B 11. Emitted $CO_2$ 10 conveys for cooling 14 and other process application.

The very high osmotic pressure Osmolyte B solution 11 conveys to and serves as a draw solution in a second forward osmosis process 12. This second forward osmosis process 12 exploits the very high osmotic pressure of the Osmolyte B solution 11 to dewater the concentrate 4 from the first forward osmosis process 2.

A highly concentrated effluent 13 conveys from the second forward osmosis process 12 to external discharge or other external processes. A dilute Osmolyte B draw solution 16 conveys from the second forward osmosis process 12 to cooled contacting 20 with cooled, previously emitted $CO_2$ 15. The dilute Osmolyte B solution 16 absorbs the $CO_2$ 15 converting to a much lower solubility but saturated Osmolyte A solution 1 and precipitated Osmolyte A solids 8. The saturated, lower solubility Osmolyte A solution 1 conveys to and serves as a draw solution for the first forward osmosis process 2 which completes the process cycle.

Figure 2:
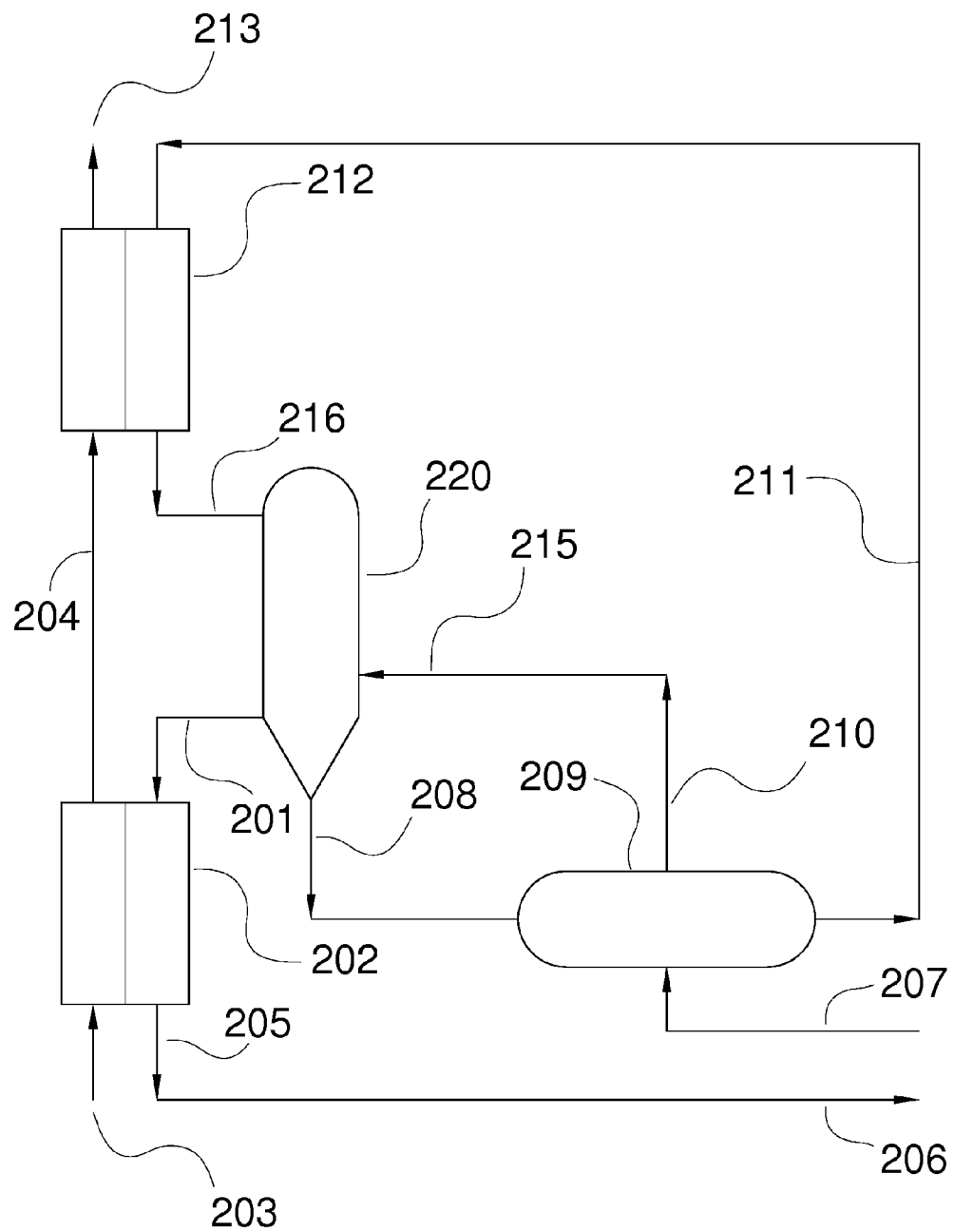
FIG. 2 depicts a process diagram of the preferred embodiment of the present invention employing two forward osmosis processes wherein the concentrate from the first is dewatered from the second wherein the highest freshwater recovery is engendered.

In another embodiment of the present invention, reference FIG. 2, a feed water stream, from which fresher water is to be extracted 203, conveys into a first forward osmosis process 202. A moderately high TDS and osmotic pressure solution (Osmolyte A) 201 conveys into and services dewatering of feed water 203 in the first forward osmosis process 202. Moderately high TDS and osmotic pressure concentrate 204 egresses the first forward osmosis process and conveys as feed water into a second forward osmosis process 212.

A dilute Osmolyte A effluent 205 from the first forward osmosis process 202 conveys as feed fluid 206 to an external freshwater extraction process. Concentrated Osmolyte A 207 returns from the external freshwater extraction process as a high TDS, high osmotic pressure concentrate.

The returning concentrated Osmolyte A stream 207 combines and is heated 209 with precipitated solids of Osmolyte A 208. $CO_2$ is expelled 210 and conveyed for further use 215. Combined addition of Osmolyte A solute 208, heating, and $CO_2$ emission 210 converts the concentrated Osmolyte A stream 207 into a very much higher TDS and osmotic pressure Osmolyte B 211.

The very high osmotic pressure Osmolyte B solution 211 conveys to and serves as a draw solution in a second forward osmosis process 212. This second forward osmosis process 212 exploits the very high osmotic pressure of the Osmolyte B solution 211 to dewater the concentrate 204 from the first forward osmosis process 202.

A highly concentrated effluent 213 conveys from the second forward osmosis process 212 to external discharge or other external processes. A dilute Osmolyte B draw solution 216 conveys from the second forward osmosis process 212 to cooled contacting 220 with the previously expelled $CO_2$ 215. The dilute Osmolyte B solution 216 absorbs the $CO_2$ 215 converting to a much lower solubility but saturated Osmolyte A solution and precipitated Osmolyte A solids 208. The saturated, lower solubility Osmolyte A solution 201 conveys to and serves as a draw solution for the first forward osmosis process 202 which completes the process cycle.

Figure 3:
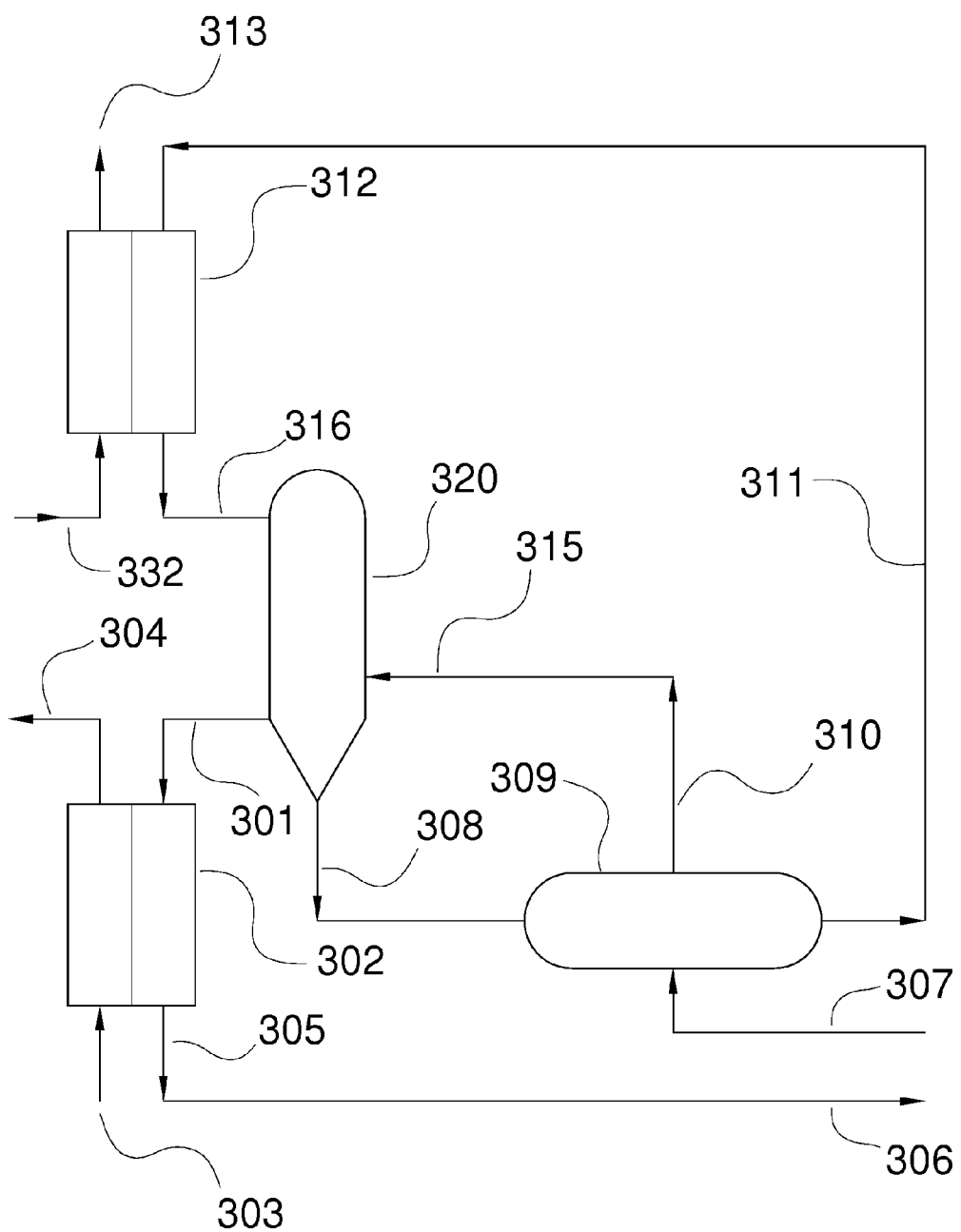
FIG. 3 depicts a diagram of an embodiment of the sent invention employing two forward osmosis processes wherein a very high TDS feed water, such as, but not limited to offsite RO or other freshwater extraction concentrate and a lower TDS feed water are sourced for each forward osmosis process.

In another useful embodiment of the invention, reference FIG. 3, a feed water stream, from which fresher water is to be extracted 303, conveys into a first forward osmosis process 302. A moderately high TDS and osmotic pressure solution (Osmolyte A) 301 conveys into and services dewatering of feed water 303 in a first forward osmosis process 302.

Moderately high TDS and osmotic pressure concentrate 304 egresses the first forward osmosis process for external discharge or further external processes. A dilute Osmolyte A effluent 305 from the first forward osmosis process 302 conveys as feed fluid 306 to an external freshwater extraction process.

Concentrated Osmolyte A 307 returns from the external freshwater extraction process as a high TDS, high osmotic pressure concentrate. The returning concentrated Osmolyte A stream 307 combines and is heated 309 with precipitated solids of Osmolyte A 308. $CO_2$ is expelled 310 and conveyed for further use 315. Combined addition of Osmolyte A solute 308, heating, and $CO_2$ emission 310 converts the concentrated Osmolyte A stream 307 into a very much higher TDS and osmotic pressure Osmolyte B 311.

The very high osmotic pressure Osmolyte B solution 311 conveys to and serves as a draw solution in a second forward osmosis process 312. This second forward osmosis process exploits the very high osmotic pressure of the Osmolyte B solution 311 to dewater an externally supplied, high TDS and osmotic pressure feed water 332.

A highly concentrated effluent 313 conveys from the second forward osmosis process 312 to external discharge or other external processes. A dilute Osmolyte B draw solution 316 conveys from the second forward osmosis process 312 to cooled contacting 320 with the previously expelled $CO_2$ 315. The dilute Osmolyte B solution 316 absorbs the $CO_2$ 315 converting to a much lower solubility but saturated Osmolyte A solution and precipitated Osmolyte A solids 308.

The saturated, lower solubility Osmolyte A solution 301 conveys to and serves as a draw solution for the first forward osmosis process 302 which completes the process cycle.

Figure 4:
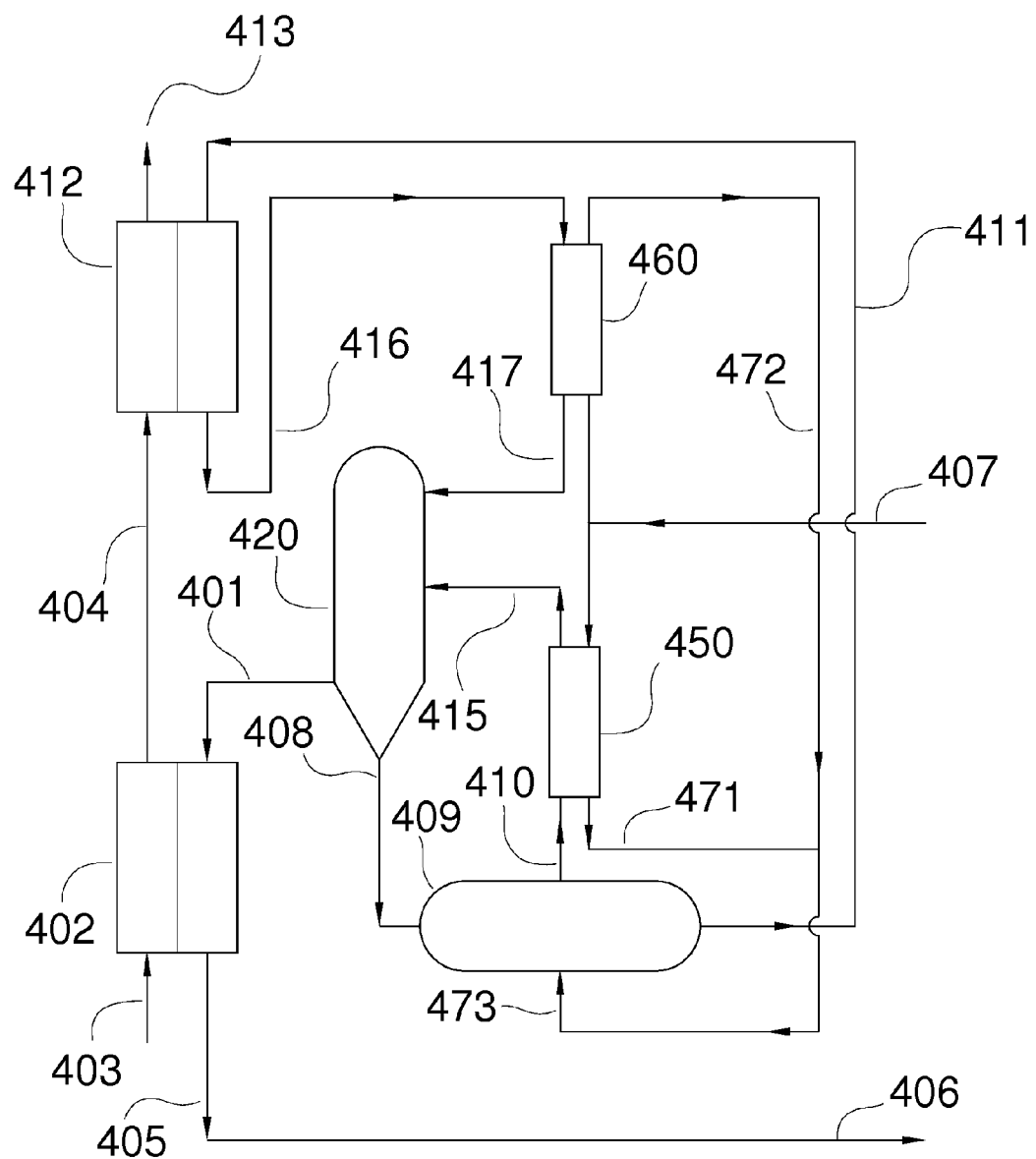
FIG. 4 depicts a diagram of an embodiment of the present invention wherein the highest freshwater recovery is engendered. This embodiment employs multiple recycle of thermal energy to imbue thermal efficiency.

In another useful potentially energy recycling embodiment of the invention, reference FIG. 4, a feed water stream 403, from which fresher water is to be extracted, conveys into a first forward osmosis process 402. A moderately high TDS and osmotic pressure solution (Osmolyte A) 401 conveys into and services dewatering of feed water 403 in a first forward osmosis process 402.

Moderately high TDS and osmotic pressure concentrate 404 egresses the first forward osmosis process and conveys as feed water into a second forward osmosis process 412. A dilute Osmolyte A effluent 405 from the first forward osmosis process 402 conveys as feed fluid 406 to an external freshwater extraction process. Concentrated Osmolyte A 407 returns from the external freshwater extraction process as a high TDS, high osmotic pressure concentrate.

The returning concentrated Osmolyte A stream 407 splits to provide cooling to other processes in this embodiment, being itself warmed by this service. The warmed concentrated Osmolyte A split stream 472 and 471 recombines 473 and is further combined and heated as necessary 409, with precipitated solids of Osmolyte A 408. $CO_2$ is expelled 410 for further process use. The combined addition of Osmolyte A solute 408, heating, and $CO_2$ emission 410 converts the concentrated Osmolyte A stream 473 into a very much higher TDS and osmotic pressure Osmolyte B 411.

The very high osmotic pressure Osmolyte B solution 411 conveys to and serves as a draw solution in a second forward osmosis process 412. This second forward osmosis process exploits the very high osmotic pressure of the Osmolyte B solution 411 to dewater the concentrate 404 from the first forward osmosis process 402.

A highly concentrated effluent 413 conveys from the second forward osmosis process 412 to external discharge or other external processes. A dilute Osmolyte B draw solution 416 conveys from the second forward osmosis process 412 for cooling by heat exchange 460 with a split stream of the Osmolyte A concentrate 407. The cooled dilute Osmolyte B draw solution 417 conveys to a cooled $CO_2$ contactor 420. The emitted $CO_2$ 410 is cooled by heat exchange 450 with a split stream of Osmolyte A concentrate 407 providing cooled $CO_2$ 415 to the contactor 420. During cooled $CO_2$ contact the cooled, dilute Osmolyte B solution 416 absorbs the cooled $CO_2$ 415 converting to a much lower solubility but saturated Osmolyte A solution 401 and precipitated Osmolyte A solids 408.

The saturated, lower solubility Osmolyte A solution 401 conveys to and serves as a draw solution for the first forward osmosis process 402 which completes the process cycle.

A novel and beneficial feature of the preferred embodiment of the invention is the high concentration which can be achieved from the very high TDS and osmotic pressure draw solution servicing the second forward osmosis process. This feature engenders the process invention with much higher water recovery than demonstrated by the prior art, thereby enhancing performance, efficiency and environmental stewardship.

A novel aspect of the present invention is the use of a salt which, through thermally activated addition or emission of $CO_2$, can be converted from a moderately high solubility solute, with associated moderately high osmotic pressure, to a very high solubility solute, with associated very high osmotic pressure in a completely reversible manner. The engagement of this effect while in the employ of two or more forward osmosis processes proffers the ability to assist conventional freshwater recovery processes to both substantially improve their freshwater recovery efficiency and additionally to enable said freshwater extraction processes to successfully generate freshwater from much higher osmotic pressure water sources than previously possible.

Although the present invention and its advantages and benefits have been described in detail, it should be understood that various changes, substitutions and alterations can be made herein without departing from the spirit and scope of the present invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Finally, in the foregoing discussion and in the claims, the terms "including" and "comprising" are used in an open-ended fashion, and thus should be interpreted to mean "including, but not limited to . . . ".

What is claimed is:

1. A method of staged forward osmosis comprising:
dewatering an externally supplied feed stream using a bicarbonate form of a metallic salt in a first draw solution in a first forward osmosis stage, wherein the metallic salt is sodium or potassium;
dewatering concentrate from the first forward osmosis stage using a carbonate form of the metallic salt in a second draw solution in a second forward osmosis stage;
applying heat to transform the bicarbonate form of the metallic salt from the first draw solution to the carbonate form of the metallic salt; and
applying carbon dioxide to transform the carbonate form of the metallic salt from the second draw solution to the bicarbonate form of the metallic salt.

2. The method of claim 1, wherein one or more process accelerants are included in the first draw solution to improve conversion rates of the bicarbonate metal salt into the carbonate metal salt.

3. The method of claim 1, wherein one or more process accelerants are included in the first draw solution to improve conversion rates of the bicarbonate metal salt into the carbonate metal salt, and wherein at least one of the process accelerants is carbonic anhydrase.

4. The method of claim 1, wherein one or more process accelerants are included in the draw solution to improve conversion rates of the carbonate metal salt into the bicarbonate metal salt.

5. The method of claim 1, wherein one or more process accelerants are included in the draw solution to improve conversion rates of the carbonate metal salt into the bicarbonate metal salt, and wherein at least one of the process accelerants is carbonic anhydrase.

6. A method of forward osmosis, comprising:
dewatering any comparatively lower osmotic pressure feed waters using a first forward osmosis process with a draw solution containing a bicarbonate form of a metal salt, wherein the metal salt is sodium or potassium;
dewatering any comparatively higher osmotic pressure feed waters using a second forward osmosis process with a draw solution containing a carbonate form of the metal salt;
applying heat to transform the bicarbonate form of the metal salt from the first draw solution to the carbonate form of the metal salt; and
applying carbon dioxide to transform the carbonate form of the metal salt from the second draw solution to the bicarbonate form of the metal salt.

7. The method of claim 6, wherein one or more process accelerants are used during the first forward osmosis process to improve conversion rates of the bicarbonate metal salt into the carbonate metal salt.

8. The method of claim 6, wherein one or more process accelerants are used during the first forward osmosis process to improve conversion rates of the bicarbonate metal salt into the carbonate metal salt, wherein at least one of the process accelerants is carbonic anhydrase.

9. The method of claim 6, wherein one or more process accelerants are included in the second forward osmosis process to improve conversion rates of the carbonate metal salt into the bicarbonate metal salt.

10. The method of claim 6, wherein one or more process accelerants are included in the second forward osmosis process to improve conversion rates of the carbonate metal salt into the bicarbonate metal salt, and wherein at least one of the process accelerants is carbonic anhydrase.

11. The method of claim 6, wherein the comparatively higher osmotic pressure feed water is at least partially concentrate from an external fresh water extraction process.

* * * * *